June 14, 1960  T. A. HERBERT, JR  2,940,557
NICKEL PLATED HONEYCOMB PANEL
Filed Sept. 20, 1955  3 Sheets-Sheet 1
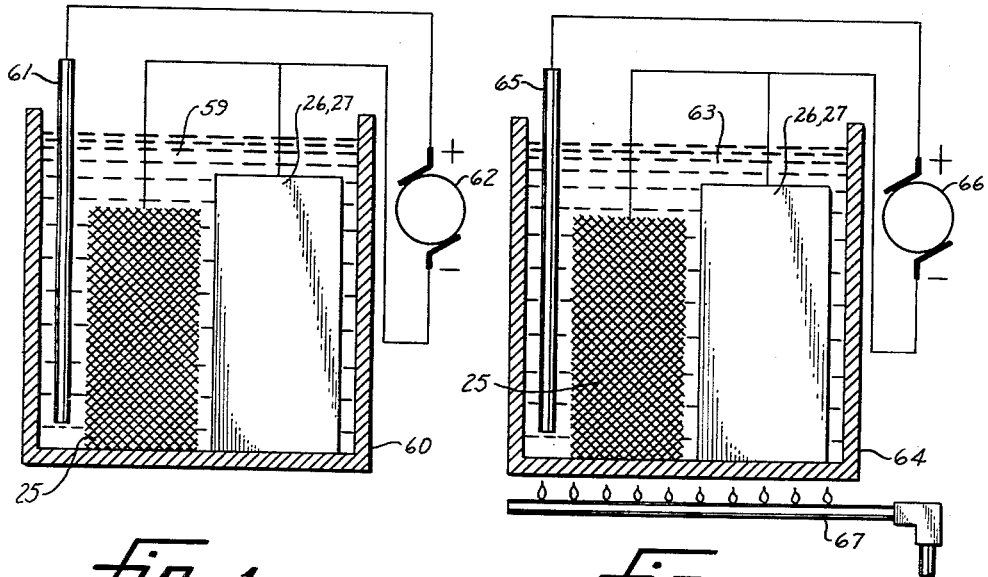
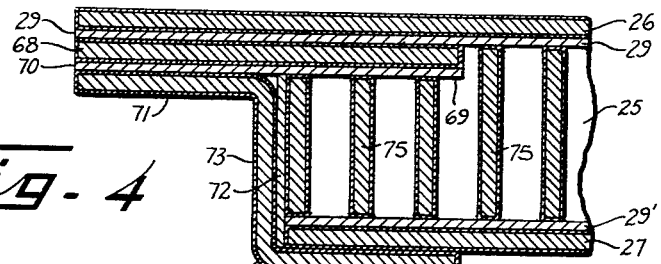
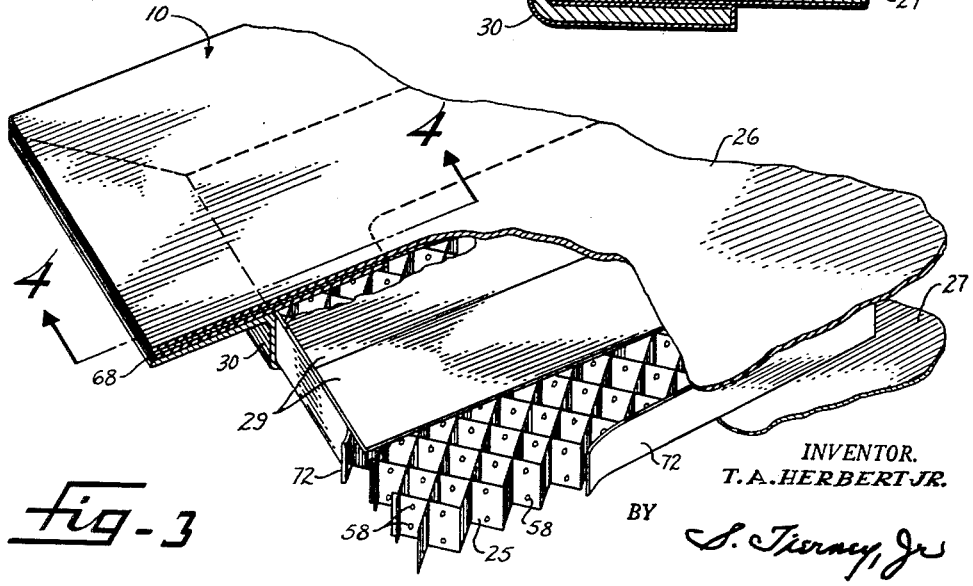
INVENTOR.
T. A. HERBERT JR.
BY
S. Tierney, Jr
ATTORNEY June 14, 1960
T. A. HERBERT, JR
2,940,557
NICKEL PLATED HONEYCOMB PANEL
Filed Sept. 20, 1955
3 Sheets-Sheet 2
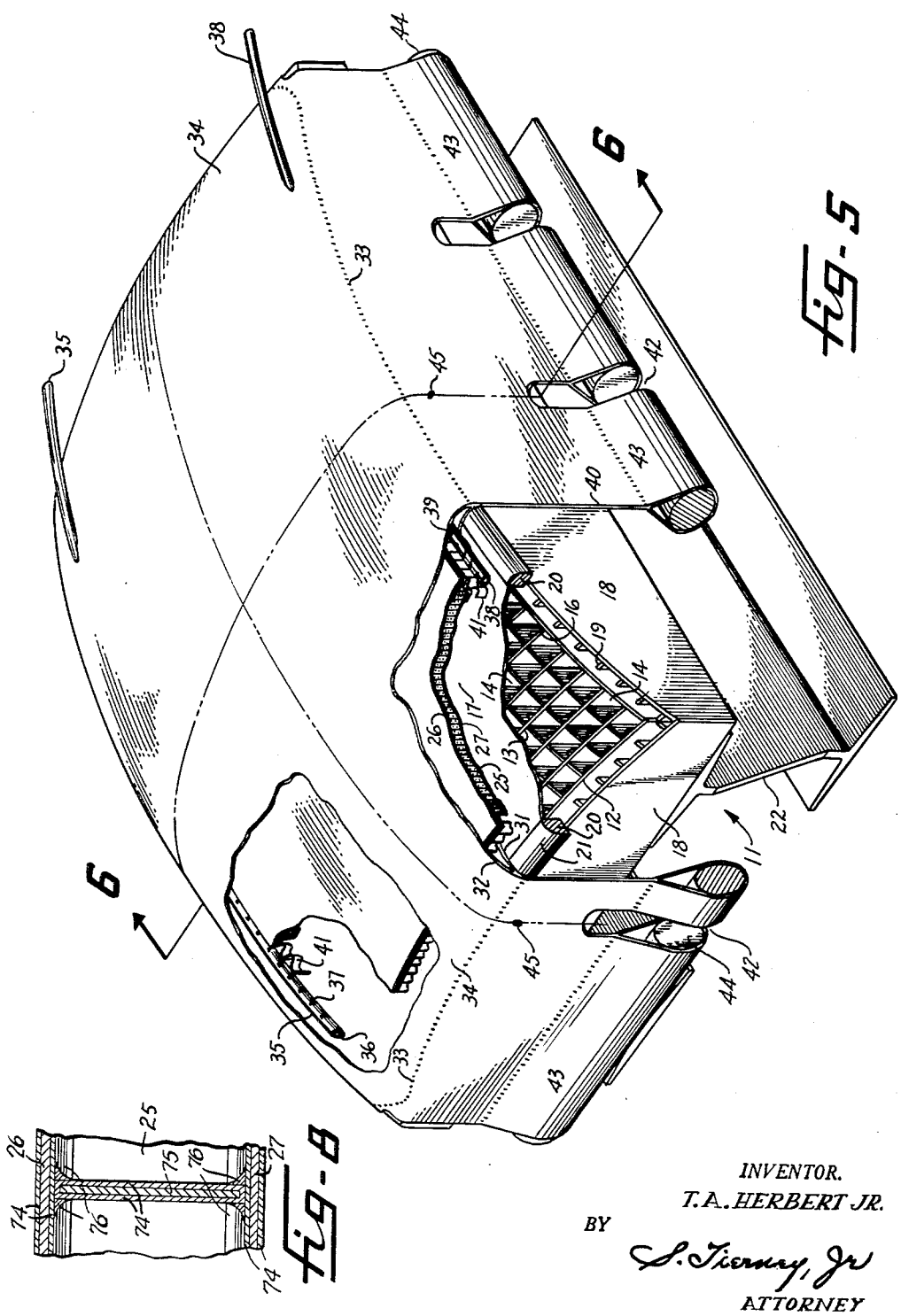
INVENTOR.
T. A. HERBERT JR.
BY
S. Tierney, Jr
ATTORNEY June 14, 1960  T. A. HERBERT, JR  2,940,557
NICKEL PLATED HONEYCOMB PANEL
Filed Sept. 20, 1955  3 Sheets-Sheet 3
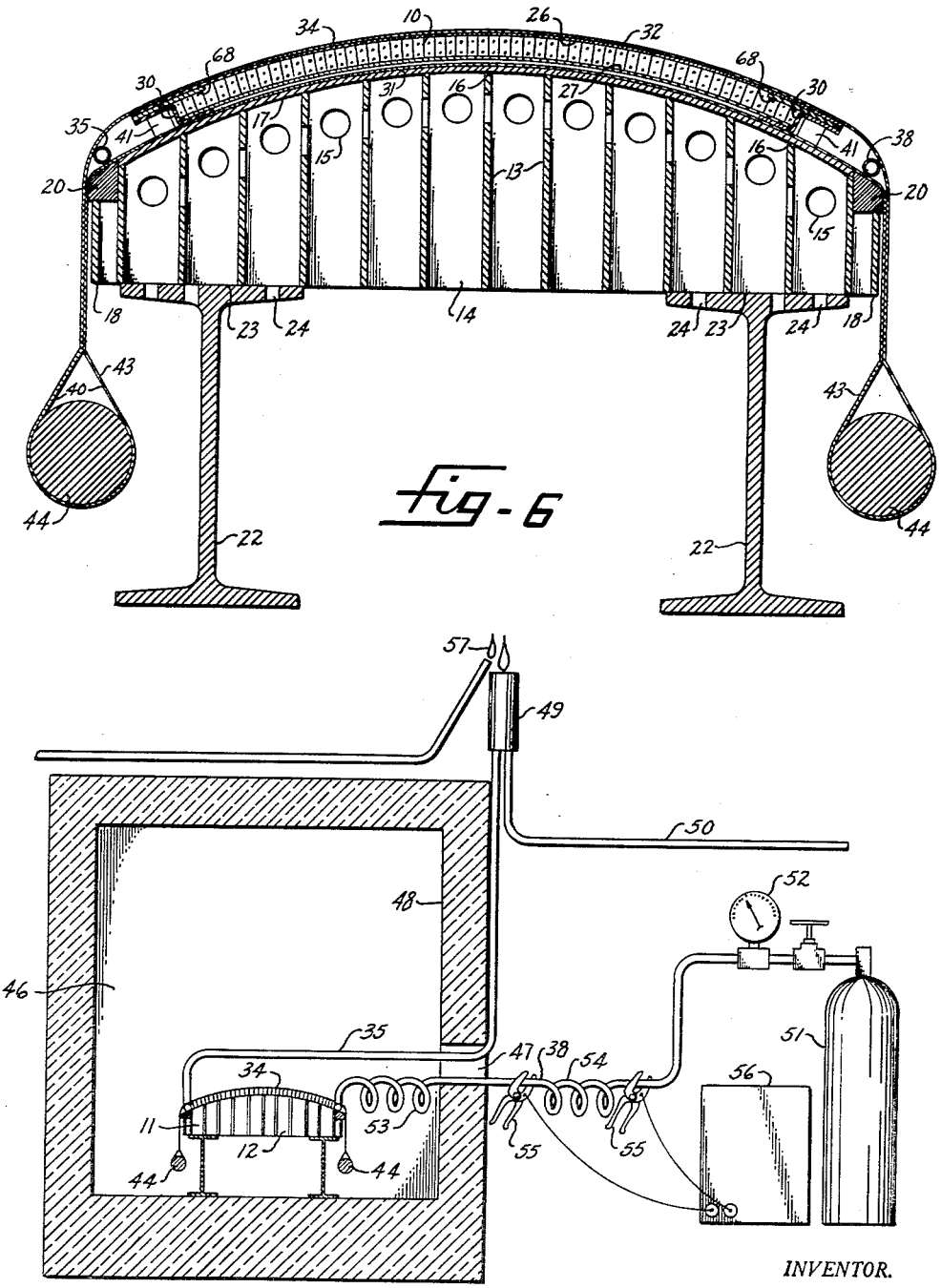
INVENTOR.
T.A. HERBERT JR.
BY
S. Tierney, Jr
ATTORNEY

United States Patent Office 2,940,557
Patented June 14, 1960

2,940,557
NICKEL PLATED HONEYCOMB PANEL

Thomas A. Herbert, Jr., Chula Vista, Calif., assignor to Rohr Aircraft Corporation, Chula Vista, Calif., a corporation of California Filed Sept. 20, 1955, Ser. No. 535,343

1 Claim. (Cl. 189—34)

This invention is an improvement on that shown in my pending application Serial No. 501,820, filed April 18, 1955. The aforesaid application discloses a method for brazing a central honeycomb core to two metal skins or plates to make a sandwich panel by inserting a thin foil of brazing metal between the core and each skin and heating the assembled sandwich to the fusion temperature of the foil. It has been found that the brazing metal attaches itself more easily to the core and skins and makes a stronger bond between the component parts if the skins and core have previously been coated with a thin plating of suitable metal of high melting point.

It is accordingly a purpose of my invention to provide such a coating by electrically plating a thin layer of substantially pure nickel on both the core and skins prior to assembly of the sandwich.

In cases where a doubler member is used around the edge of the panel to project beyond the core and provide a means for connecting the panel to another structure in an assembly, it is a further object of the invention to provide an electrically plated coating on the doubler.

Also in cases where the edge of the honeycomb core is to be surrounded and enclosed by a metal closure member, a further object is to plate such closure member with a thin plating of metal which becomes securely bonded to the closure member and core and assists in securing a strong brazed joint between the members.

Other objects will become apparent as the description of the novel method of making a honeycomb panel proceeds. For a better understanding of the invention, reference is made to the accompanying drawings, in which:

Figs. 1 and 2 are schematic drawings of apparatus used for electroplating component parts of a honeycomb panel;

Fig. 3 is a fragmentary perspective view partly in section of a portion of a sandwich panel;

Fig. 4 is an enlarged view taken on line 4—4 of Fig. 3 showing a portion of the panel and with the thickness of the nickel plating exaggerated for clarity;

Fig. 5 is a perspective view of a supporting fixture on which a sandwich panel having curved surfaces is supported with sections of both panel and fixture cut away to show details of their construction;

Fig. 6 is a cross sectional view of Fig. 5 taken on line 6—6;

Fig. 7 is a schematic drawing of the apparatus used for brazing the parts of a honeycomb panel together; and Fig. 8 is an enlarged fragmentary sectional view of the sandwich panel taken through a common side wall of adjoining cells.

After cleaning in any known manner, two sheets of stainless steel 26, 27 and a cellular honeycomb core 25, also made of stainless steel, are immersed in a plating bath 59 contained in a tank 60 (Fig. 1). The sheets and core are preferably made of 17–7PH stainless steel having approximately the composition

| | Percent by weight |
|---|---|
| Chromium | 17 |
| Nickel | 7 |
| Aluminum | 1 |
| Carbon | 0.07 |
| Iron | balance |

A nickel anode 61 in the bath is connected to the positive terminal of a direct current generator 62 and the sheets and core to the negative generator terminal. Bath 59 preferably has the composition

| | Ounces per gallon |
|---|---|
| Nickel chloride, $NiCl_2 \cdot 6H_2O$ | 32 |
| Boric acid, $H_3BO_3$ | 5 |
| Hydrochloric acid, HCl | 4 |
| Water | balance | although other known nickel salt solutions capable of forming a thin strike plating on the parts may be used instead. With bath 59 at a temperature of about 70° F. and using a current density of between 20 to 40 amperes per square foot, in from 60 to 90 seconds core 25 and plates 26, 27 are completely covered with a thin strike plating of nickel which adheres strongly to the surfaces of the parts.

The plated parts are taken out of bath 59 and immediately placed in a nickel plating bath 63 contained in a tank 64. A nickel anode 65 in bath 63 is connected to the positive terminal of a direct current generator 66 and the plated core 25 and sheets 26, 27 to its negative terminal. Bath 63 is preferably kept at a temperature between 130° and 135° F. by heat supplied to tank 64 by any suitable heater, such as a gas burner 67.

Plating solution 63 preferably has the composition:

| | Ounces per gallon |
|---|---|
| Nickel sulphate $NiSO_4 \cdot 7H_2O$ | 40 |
| Nickel chloride $NiCl_2 \cdot 6H_2O$ | 6.0 |
| Boric acid $H_3BO_3$ | 5.0 |
| Water | balance |

A bright nickel plating is deposited by bath 63 and the plating is continued until the nickel film has a thickness of from .0005 to .001 inch. The same plating procedure is followed with a closure member 30 and doubler 68 to be later described, these members preferably being made of 17–7PH stainless steel.

Referring to Figs. 5 and 6 of the drawing, sandwich panel 10 having a compound curved surface is shown supported on a fixture 11 preparatory to the brazing operation. Fixture 11 comprises a rigid metal lattice 12 composed of flat metal bars 13 intersecting each other at substantially right angles to form a series of cells 14. The walls of cells 14 are provided with openings 15 therethrough which permit air to circulate freely throughout lattice 12. The upper surface 16 of the lattice is machined to the contour of the panel to be supported thereon, and is covered by a steel sheet 17 which is formed to the contour of surface 16 to provide a smooth continuous surface for supporting panel 10. A rigid frame 18 completely surrounds lattice 12 and is rigidly connected thereto by a set of connecting ribs 19. A metal molding 20 having a smooth rounded face 21 blending with sheet 17 and extending out beyond frame 18 surrounds lattice 12 and is supported by frame 18. Lattice 12 is supported on I beams 22 the upper faces 23 of which are provided with openings 24 (Fig. 6) communicating with cells 14.

Panel 10 comprises the nickel plated cellular core 25 positioned between the nickel plated upper skin or sheet 26 and the nickel plated lower sheet 27 with the walls of the honeycomb cells disposed transversely to the surfaces of skins 26, 27. The upper face of the panel is undercut as indicated at 69 (Fig. 4) all around its edge to receive a nickel plated metal sheet or doubler 68, a thin strip 70 of brazing alloy being interposed between the undercut edge 69 of core 25 and the upper horizontal extension 71 of closure member 30 which entirely surrounds core 25. Abutting strips 29 (Figs. 3 and 4) of brazing alloy cover the remainder of the top of core 25 and a strip or strips 29' of brazing alloy are interposed between the bottom of core 25 and lower plated skin 27. A continuous strip 72 of brazing alloy is interposed between the edge of core 25 and the vertical limb 73 of member 30. It has been found that by making the strips 70, 29, 29' and 72 about .002 inch thick from an alloy consisting of 85 percent silver and 15 percent manganese, the assembled parts of the panel become strongly secured together when heated to a temperature of about 1800° F. If the parts of the panel are made of material other than stainless steel, a brazing alloy is used which will fuse and adhere to the nickel plating at a temperature considerably below the melting point of the metal composing core 25 and skins 26—27. Member 30 may be one of various shapes in cross section such as a U shape or Z shape, as shown, and is for the purpose of providing a closure around the edge of the core and also a projection adapted to receive any suitable fastening means (not shown) which connect the panel to another structure. If desired, a strip of brazing alloy (not shown) may be inserted between the lower face of skin 27 and member 30. After assembly, the component parts of the panel are tack welded together to retain them in place during the brazing operation.

The assembled panel is placed between two sheets 31 and 32 of flexible sheet metal both of which are of substantially greater size than skins 26, 27. Sheets 31 and 32 are secured together as by resistance seam welding along a line extending entirely around panel 10 as shown at 33 (Fig. 5), thus forming a sealed envelope 34 containing the panel. Envelope 34 is provided with an outlet tube 35 passing through sheet 31 and extending along one side of the panel within the envelope. The inner end 36 of tube 35 is closed and the portion of the tube within the envelope is provided with spaced apart slots 37 passing through the wall thereof. Envelope 34 is also provided with an inlet tube 38 which passes through sheet 31 and extends along the opposite side of panel 10 within the envelope. The portion of tube 38 within envelope 34 is provided with spaced apart openings 39 which are of such size that their combined area is approximately equal to the cross sectional area of tube 38 and the inner end (not shown) of tube 38 is closed. The extending edges 40 of sheets 31 and 32 are secured together and portions cut away as shown at 42 to provide a set of slings 43 adapted to receive weights 44.

Envelope 34 containing panel 10 is placed on fixture 11, as shown in Figs. 5 and 6, with the center of the panel in substantial alignment with the center of lattice 12. To facilitate this procedure, sheets 31 and 32 are provided with small openings 45 passing therethrough outwardly of seam 33 which are aligned with suitable locating marks (not shown) on fixture 11. Weights 44 are placed in slings 43 and permitted to hang down and apply tension to the edges of envelope 34 thus causing sheet 31 to conform to the contour of sheet 17 and sheet 32 to press sheets 26 and 27 against core 25. To prevent damage to the edges of panel 10 from the force with which they are pressed against fixture 11, a rigid supporting member 41 shaped as an undulate strip of metal is placed under the top projecting portion of closure member 30, as shown in Figs. 5 and 6, to support the edges of the panel.

In the above description of fixture 11 the upper surface 16 of lattice 12 is machined to a contour adapted to support panel 10 which is illustrated as having two curved skins 26, 27 resting against cellular core 25 the major portion of which is of uniform thickness. It is to be understood that fixture 11 may be modified to support a panel the bottom of which is flat. In this case the upper surface of lattice 12 is machined to a plane face to provide a plane support for flat sheet 17 and envelope 34.

Referring to Fig. 7, fixture 11 supporting envelope 34 and panel 10 is placed in a furnace 46 with tubes 35 and 38 extending out through an opening 47 in the wall 48 thereof. Outlet tube 35 is attached to an aspirator 49 of known type operated by compressed air supplied by a source (not shown) through an air line 50, for the purpose of withdrawing air from within sealed envelope 34. Inlet tube 38 is connected to a source 51 of dry hydrogen or other inert gas and is provided with a regulator 52 to control the amount of gas entering envelope 34 therethrough. A section of tube 38 within the furnace 46 is formed in a spiral coil 53 and a section outside of the furnace is formed in a spiral coil 54 to provide means for heating the hydrogen gas as it passes through coil 54. Coil 54 is heated by its resistance to an electrical current passing therethrough between connections 55 attached to tube 38 at each end of coil 54 and which are connected with the secondary winding of an electrical transformer 56. The electrical current flowing through coil 54 may be controlled by adjustment of transformer 56 in any known manner to bring the temperature of the gas leaving coil 54 up to a desired value. Coil 53 within furnace 46 is heated by the furnace atmosphere so that the temperature of the gas is further increased while passing through coil 53 before entering envelope 34.

To perform the brazing operation, air is withdrawn from within envelope 34 through outlet tube 35 by means of aspirator 49 to lower the pressure within envelope 34 a substantial amount below the pressure of the ambient furnace atmosphere. The decreased pressure within envelope 34 causes the pressure of the ambient atmosphere to press sheets 31 and 32 inwardly against plated skins 26 and 27 thereby forcing the alloy strips 29, 29' into contact with the nickel covered ends of the cells of core 25. Hydrogen gas from source 51 is permitted to flow through tube 38 into envelope 34, the rate of flow being controlled by regulator 52 so that pressure within envelope 34 remains below the pressure of the surrounding furnace atmosphere. The air withdrawn from within envelope 34 enters tube 35 through slots 37 along one side of panel 10 and the hydrogen gas admitted into envelope 34 leaves tube 38 through openings 39 on the opposite side of the panel so that withdrawal of air from envelope 34 and core 25 and its replacement with hydrogen gas takes place quickly. To prevent the pressure within envelope 34 from rising during the brazing operation, aspirator 49 remains in operation to continually withdraw a small amount of hydrogen from within envelope 34, the gas being ignited by a pilot flame 57 as it leaves aspirator 49 to render it harmless. To facilitate withdrawal of air from panel 10 and to permit the hydrogen gas to flow quickly into all parts of core 25, the cell walls are provided with small holes 58 (Fig. 4) which form passages connecting individual cells.

Furnace 46 is gradually heated by any known type of heating means (not shown) to a temperature within the range of 1700° to 1850° F. and electrical current is passed through coil 54 to heat the hydrogen gas passing therethrough. The hot furnace atmosphere circulates freely through lattice 12 passing through openings 15 (Fig. 6) in the walls of cells 14 to uniformly heat panel 10. Also due to the preheating of the hydrogen gas by coils 53 and 54 before it enters panel 10, the entire panel soon reaches the brazing temperature which causes the several strips of brazing alloy to melt and adhere to the nickel plating on sheets 26, 27, closure member 30, doubler 68, and that on the ends of the cells of core 25. When the brazing is completed, transformer 56 is disconnected and the flow of hydrogen through tube 38 stopped. Tubes 35 and 38 are disconnected from aspirator 49 and hydrogen tank 51 respectively, whereupon fixture 11 is removed from the furnace. Envelope 34 and panel 10 are allowed to slowly cool to room temperature when the brazed panel is removed from the envelope. The brazing operation having taken place in an atmosphere free of oxygen, all the component parts of the sandwich panel are entirely free from scale or other undesirable effects which would result if air or oxygen were present in envelope 34 during the brazing operation. The presence of the thin nickel plate on core 25 and skins 26, 27 is found to cause the silver-manganese braze alloy to accumulate at the ends of the cell walls 75 and form strong, thick fillets 76 which securely bond the ends of the cells to the abutting skins. It is found that in the absence of plating the core and skins, the molten braze alloy flows along the cell walls and tends to cover them with the result that most of the alloy is rendered ineffective to bond the parts together. Furthermore the silver in the brazing alloy adheres to the nickel film on core 25 and skins 26, 27 more strongly than it does to the stainless steel of the core and skins. The nickel plating also prevents the steel of the core and skins from contact with the air which would gradually form oxides on the surface of these parts. Such oxides are detrimental in that they prevent the molten braze alloy from reaching the underlying steel and becoming attached thereto.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claim, and all changes which come within the meaning and range of equivalency of the claim are intended to be embraced therein.

Having thus described my invention, what I claim as new and useful and desire to secure by Letters Patent is:

A sandwich panel comprising an upper metal sheet having its lower face covered with a thin film of coherent nickel; a lower metal sheet having its upper face covered with a thin film of coherent nickel; a metal core covered with a nickel plating and composed of a plurality of thin walled interconnected cells each having the opposite ends thereof respectively abutting the nickel films of said upper and lower sheets, said sheets and core being composed of stainless steel; and fillets of silver-manganese brazing alloy brazed respectively to said nickel films on said upper and lower sheets and to the nickel plated sidewalls of said cells at said opposite ends thereof, said silver-manganese alloy consisting of 85% silver and 15% manganese, said alloy having a melting point substantially lower than that of said nickel films and plating and lower than that of the parent metal of said sheets and core so that alloying of the brazing alloy with the nickel and melting of the parent metal are prevented as said fillets are brazed to the nickel covering on said sheets and core.

References Cited in the file of this patent

UNITED STATES PATENTS

| | | |
|---|---|---|
| 673,126 | Martin | Apr. 30, 1901 |
| 2,060,608 | Butler et al. | Nov. 10, 1936 |
| 2,297,357 | Kelley | Sept. 29, 1942 |
| 2,417,662 | Rosales | Mar. 18, 1945 |
| 2,464,821 | Ludwick et al. | Mar. 22, 1949 |
| 2,585,043 | Sandberg | Feb. 12, 1952 |
| 2,587,116 | Clay | Feb. 26, 1952 |
| 2,609,068 | Pajak | Sept. 2, 1952 |
| 2,654,946 | Rhodes et al. | Oct. 13, 1953 |
| 2,779,999 | Boam et al. | Feb. 5, 1957 |